United States Patent [19]
Santi

[11] Patent Number: 4,793,748
[45] Date of Patent: Dec. 27, 1988

[54] BORING TOOL FOR MACHINE TOOL
[75] Inventor: Roger J. Santi, Fond du Lac, Wis.
[73] Assignee: AMCA International Corporation, Hanover, N.H.
[21] Appl. No.: 48,569
[22] Filed: May 11, 1987
[51] Int. Cl.$^4$ ............................................. B23B 117/18
[52] U.S. Cl. ..................................... 408/161; 407/45; 407/88; 408/158; 408/168
[58] Field of Search ............... 408/153, 158, 161, 168, 408/162; 407/45, 73–78, 88

[56] References Cited

U.S. PATENT DOCUMENTS

| | | |
|---|---|---|
| 1,872,667 | 8/1932 | Bryant . |
| 2,042,257 | 5/1936 | Harrison et al. ...................... 51/165 |
| 2,457,040 | 12/1948 | Penn-Gaskell Hall ................ 82/1.2 |
| 2,632,956 | 3/1953 | Crosby ................................ 33/174 |
| 2,831,387 | 4/1958 | Ovshinsky ........................... 82/24 |
| 2,998,737 | 9/1961 | Yogus et al. ........................ 77/76 |
| 3,178,969 | 4/1965 | Yogus et al. ........................ 77/58 |
| 3,254,548 | 6/1966 | Gersch ................................ 77/58 |
| 3,279,285 | 10/1966 | Ivins ................................... 77/1 |
| 3,324,529 | 6/1967 | McCreery .......................... 407/74 |
| 3,499,352 | 3/1970 | Milewski et al. .................. 77/58 |
| 3,635,572 | 1/1972 | Robinson ........................... 408/181 |
| 3,730,636 | 5/1973 | Mizoguchi ......................... 408/168 |
| 3,740,161 | 6/1973 | Milewski ............................ 408/158 |
| 3,899,724 | 8/1975 | Colton ................................ 318/162 |
| 3,914,678 | 10/1975 | Chynoweth et al. .............. 318/568 |
| 4,055,386 | 10/1977 | Chynoweth et al. .............. 408/13 |
| 4,118,139 | 10/1978 | Lemelson ........................... 408/12 |
| 4,181,958 | 1/1980 | Juengel et al. ..................... 364/560 |
| 4,193,039 | 3/1980 | Massa et al. ....................... 328/162 |
| 4,204,782 | 5/1980 | Spits et al. ......................... 408/3 |
| 4,207,567 | 6/1980 | Juengel et al. ..................... 340/680 |
| 4,223,260 | 9/1980 | Beer et al. ......................... 318/696 |
| 4,268,783 | 5/1981 | Murray .............................. 318/565 |
| 4,354,305 | 10/1982 | Plummer et al. .................. 29/568 |
| 4,400,118 | 8/1983 | Yamakage et al. ................ 408/3 |
| 4,412,465 | 11/1983 | Wright ............................... 82/1.2 |
| 4,416,569 | 11/1983 | Yamakage et al. ................ 408/4 |
| 4,473,937 | 10/1984 | Ortlieb ............................... 29/568 |
| 4,648,757 | 3/1987 | Plummer ........................... 408/161 X |

FOREIGN PATENT DOCUMENTS

| | | |
|---|---|---|
| 0043920 | 2/1982 | European Pat. Off. . |
| 2012642 | 10/1971 | Fed. Rep. of Germany . |
| 2123272 | 9/1972 | France . |
| 629040 | 10/1978 | U.S.S.R. . |
| 902582 | 8/1962 | United Kingdom . |
| 1363851 | 8/1974 | United Kingdom . |
| 2024671 | 1/1980 | United Kingdom . |

OTHER PUBLICATIONS

"Telemetry Gage System" brochure, dated Sep. 1980, of the Valeron Corporation.
"Speed Auto-Compensation System" brochure of Aug. 10, 1981, of the Valeron Corporation.
"Machine Tool Checks Up on Itself", Machine Design reprint, Apr. 22, 1976.
Vasilash, "Accurate Bores from Automatic Adjustment", Manufacturing Engineering, Apr. 1980.
Kamset Automatic Size Control System brochure of the Valeron Corporation, Aug. 1978, publn. KA-102.
Lipp, "Wear Compensation When Producing High-precision Bores", Industrial & Production Engineering, published prior to Jul. 11, 1985.
Sandvik brochure "Machining Systems—Functional Description Sandvik Autocomp System-Control Units, Compensators, Tooling".
Genicon+Samsomatic Ltd brochure "Our Tool Correction Systems", dated Aug. 1980.
Renishaw brochure "3-Dimensional Touch Trigger Probes for Machining Centres and Lathes".
"Flexible Manufacturing: The Technology Comes of Age", Iron Age, Sep. 7, 1981.

Primary Examiner—Gil Weidenfeld
Assistant Examiner—Steven C. Bishop
Attorney, Agent, or Firm—Burns, Doane, Swecker & Mathis

[57] ABSTRACT

A boring tool is made from simple bar stock without significant external machining of the tool body. By providing a longitudinal bore which intersects a transverse slot, a longitudinally slidable wedge with splines can cooperate with a disc carried by a tool bar slidably received in the transverse slot. To ensure the most precise alignment between splines of the wedge and splines of a cooperating disc in the tool bar, the disc of the tool bar is attached to the tool bar with epoxy cement while the splines of the disc are engaged with the splines of the wedge. With the splines of the wedge being angularly offset from the longitudinal axis of the wedge, translation of the wedge will ensure accurately controlled movement of the tool bar.

11 Claims, 4 Drawing Sheets

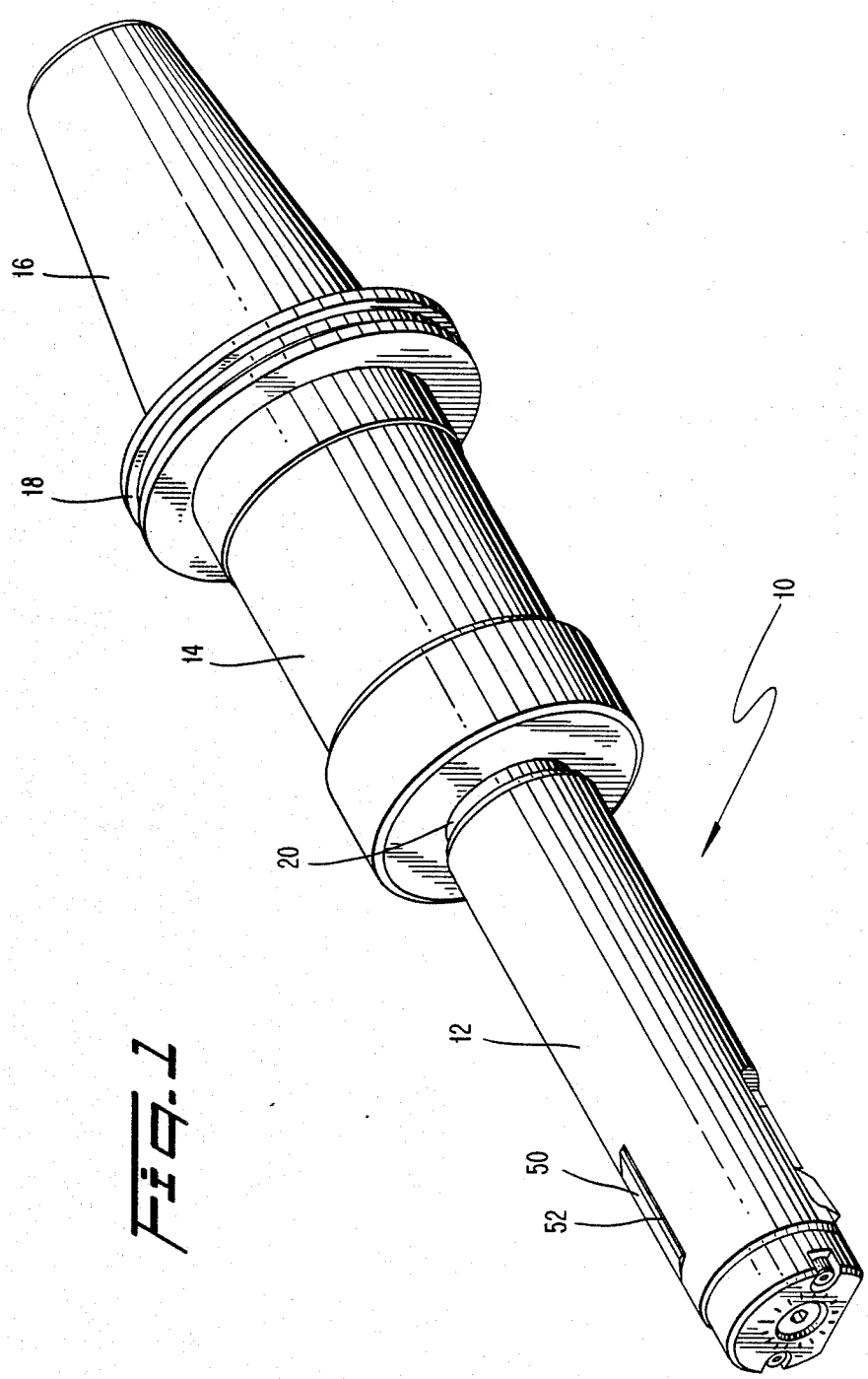

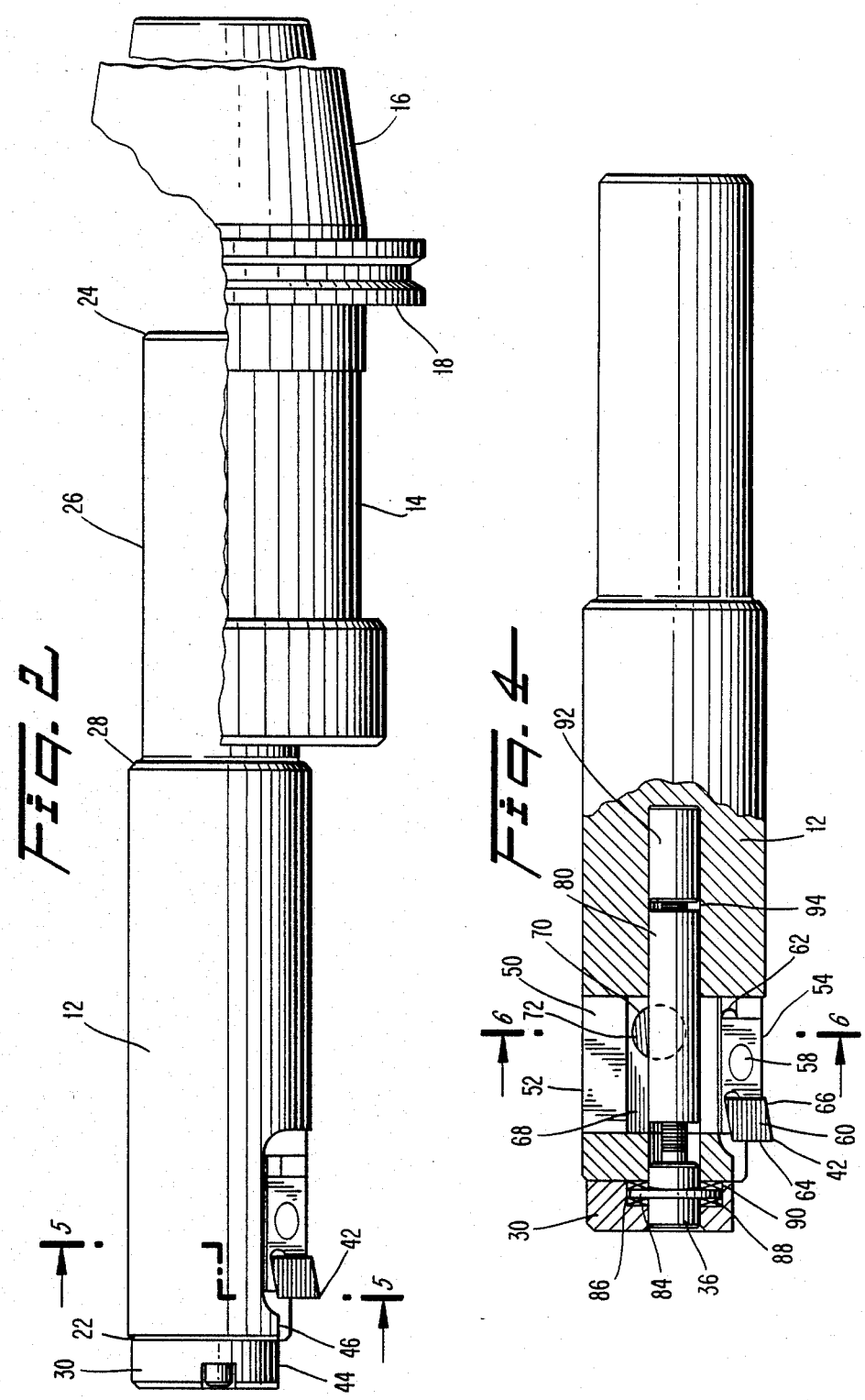

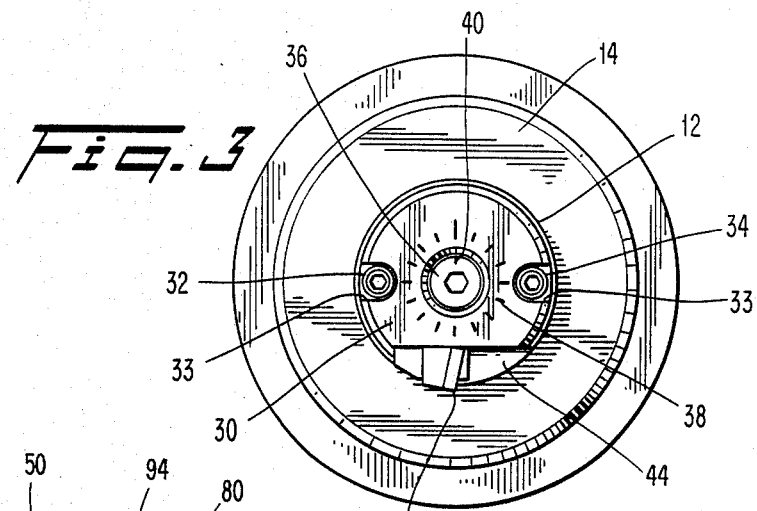
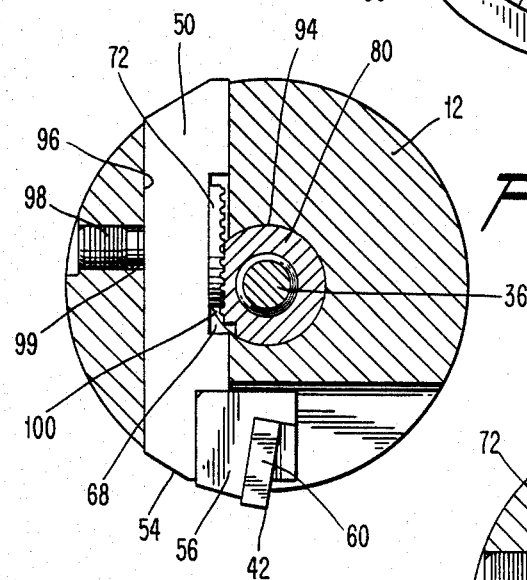
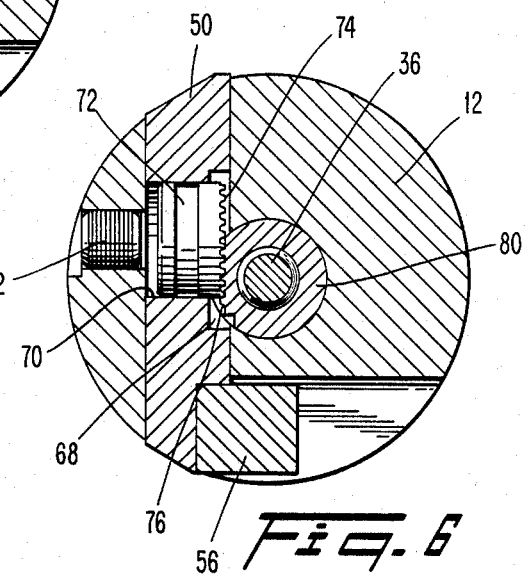
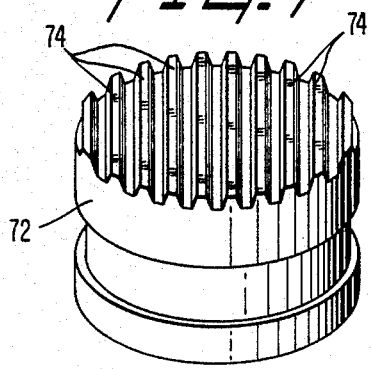

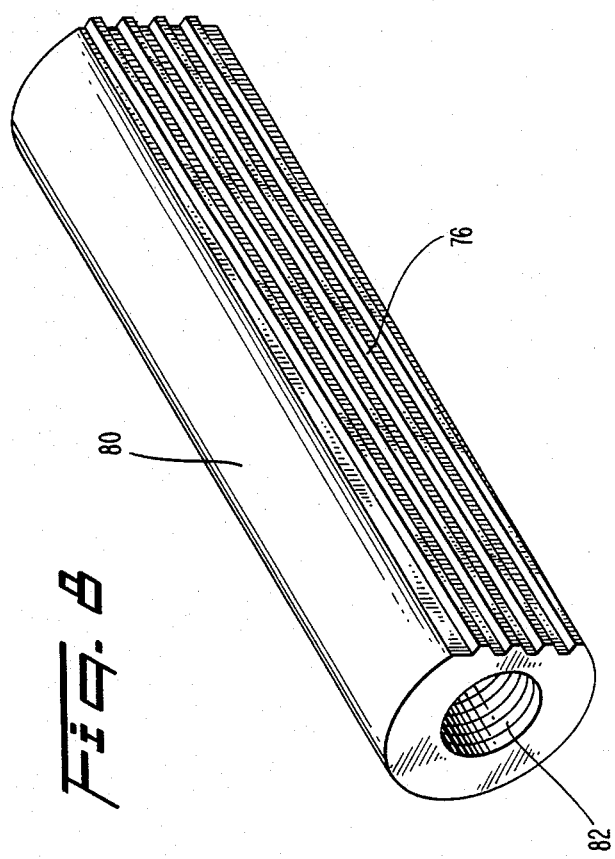

BORING TOOL FOR MACHINE TOOL

CROSS-REFERENCES TO RELATED PATENT APPLICATION

Pending United States patent application Ser. No. 442,625, of Harvey R. Plummer was filed Nov. 18, 1982, now U.S. Pat. No. 4,648,757, for a Precision Adjustment System for Boring Tools and is considered to be broadly related to the present invention.

TECHNICAL FIELD

The present invention relates generally to boring tools of the type suitable for use in connection with machining centers, numerically-controlled machine tools and the like. In particular, the present invention deals with an improved design for a boring tool which results in a more accurate tool.

BACKGROUND

In the past boring tools for use with numerically controlled machine tools have been known. The boring tool is typically used when it is necessary to machine a cylindrical opening in a block of metal so that a finished, machined part can be provided. Generally speaking, a boring tool is different from a drilling tool: the drilling tool a removes metal to define a generally cylindrical opening in the part; whereas, the boring tool operates on an existing cylindrical opening to create a finished opening which has much better tolerances on roundness of the opening and cylindricalness of the opening.

In some cases, the bore must be perfectly cylindrical from one end to the other. In other cases, the bore has changes in its diameter at predetermined locations along the length of the bore. One very common example of such a change in diameter is a counterbore at the entrance to the opening.

In order for a boring tool to be useful in a machine tool so that the boring tool can machine a cylindrical bore with the necessary diameters and tolerances, it is of course necessary that such a boring tool be capable of very accurate adjustment in both the axial direction (along the longitudinal axis of the boring tool) and in the radial direction.

In the past, suitable boring tools have been carefully machined wit a high degree of precision in longitudinal and radial adjustability. For example, it is known to carefully machine a generally square piece of material with a rectangular bore extending longitudinally and essentially tangential to a transverse slot in which a tool bar is slidable received. The rectangular bore receives a wedge assembly which includes a wedge and closely fitted bearing shoes which guide the wedge during longitudinal movement. Longitudinal movement of the wedge is transformed into radial movement of the tool bar through cooperation of splines on the wedge with splines on the tool bar.

Control on the accuracy of movement of the tool bar depends on the precision with which the cooperating splines can be fitted together. Moreover, to the extent that precise fitting of the splines is not obtained, unacceptable tolerances will rapidly develop as a result of wear caused by use of the tool.

In addition to such alignment problems, known boring tools require a large number of pieces each of which requires precise machining. For example, the tool body itself is often machined as is the wedge, its guides, the tool bar and cooperating structures. As is well known, the expense of producing any part is a function of the number and precision of machining operations which are required to make the part. Accordingly, the known boring tools are known to be economically expensive.

It would, naturally, be advantageous to have a boring tool in which alignment of the driving splines could be accurately controlled during manufacture. In like fashion, it would be advantageous to have a boring tool in which the number of precision machining operations could be significantly reduced so that the boring tool could be manufactured more economically.

Accordingly, it is seen that the need continues to exist for a new boring tool which overcomes problems of the type discussed above.

SUMMARY OF THE INVENTION

To overcome the problems of the prior art boring tools, the tool body is provided with a longitudinal bore to receive a wedge and a transverse slot to receive a tool bar. There is a slight overlapping relationship between the slot and the bore such that a common volume is defined by the slot and the bore. The wedge is cylindrical in cross-sectional shape and has a flat side with splines which protrude into the common volume of between the bore and the slot. The tool bar has a cooperating splined surface which protrudes into the common volume between the bore and the slot and which mates with the splines of the wedge in that location. With the splines of the wedge being positioned at a predetermined angle to the axis of the wedge, longitudinal movement of the wedge is translated into radial movement of the tool bar. Means for moving the wedge are provided on the boring tool also. The wedge moving means may, for example, be a screw having a fine pitch on which the wedge is threadably mounted within the longitudinal bore.

To reduce the number of machined parts that would otherwise be required, the tool body may be made from a simple piece of circularly cylindrical bar stock. The only machining operations required for the external contour of the tool body are those machining operation necessary to prepare the tool body to receive the tool bar, the adjusting wedge, and the end to mate with the tool holder.

So that the splines of the tool bar can be most accurately mated with cooperating splines of the wedge, the boring tool can be provided with a means for minimizing the clearance between the splines of the wedge and the splines of the tool bar. Such a device can be a simple screw disposed perpendicularly to the plane of the slot and having a low friction material on the end thereof in contact with the tool bar. With this arrangement, the tool bar can be biased toward tight engagement with the splines of the wedge to minimize the effect of manufacturing tolerances on accuracy of the boring tool.

To conveniently assemble the wedge and the tool bar such that the cooperating splined surfaces have the best possible relationship, the splined surface of the tool bar can be provided on a generally circular disc which is received in a cooperating bore of the tool bar. By attaching the disc to the tool bar with a suitable epoxy cement and by positioning the wedge in contact with the splines of the disc while the epoxy is still wet and maintains that relationship under pressure provided by the take up screw, the splines of the wedge and the splines of the disc are positioned to give the best possible coordination therebetween.

BRIEF DESCRIPTION OF THE DRAWINGS

Many objects and advantages of the present invention will be apparent to those skilled in the art from the accompanying drawings wherein like reference numerals have been applied to like elements and wherein:

FIG. 1 is a perspective view of a boring tool of the present invention;

FIG. 2 is a side elevational view of the boring tool of FIG. 1;

FIG. 3 is an end elevational view of the boring tool of FIG. 1;

FIG. 4 is a side elevational view of the tool body of FIG. 2 with portions broken away to illustrate positional arrangement of the tool bar;

FIG. 5 is a partial cross-sectional view taken along the line 5—5 of FIG. 2, in an enlarged scale;

FIG. 6 is a partial cross-sectional view taken along the line 6—6 of FIG. 4, in an enlarged scale;

FIG. 7 is an enlarged perspective view of the disc of the present invention; and FIG. 8 is an enlarged perspective view of the wedge of the present invention.

DESCRIPTION OF THE PREFERRED EMBODIMENT

According to the present invention, a boring tool 10 (see FIG. 1) is connected to a collet tool holder 14. The collet tool holder 14 is a conventional device for attaching a machine tool, such as the boring tool 10, to a numerically controlled machine. The collet tool holder 14 typically includes a frustoconical portion 16 having a taper which matches the taper of a driving spindle (not shown) of the numerically controlled machine In addition, the collet tool holder 14 may have a drive collar 18 adjacent to the frustoconical portion 16 which can be placed in driven relationship to the numerically controlled machine tool so as to be driven thereby.

Extending inwardly from one end of the collet tool holder 14 is a bore 18 which is sized, both in diameter and in length, to receive an end of a machine tool such as tee boring tool 10. The tool body 12 is secured to the collet tool holder 14 in a suitable conventional manner. Accordingly, when the collet tool holder 14 is driven, the tool body 12 is simultaneously driven.

The tool body 12 has a distal end 22 (see FIG. 2) and an opposite end 24 which is received in the bore of the collet tool holder 14. Immediately adjacent to the opposite end 24 is a cylindrical stud 26 which may be set off from the main portion of the tool body 12 by a shoulder 28. Significantly, the tool body 12 may be fabricated from a circularly cylindrical piece of high grade tool steel bar stock. The stud 26 can be made by a simple turning operation. The shoulder 28, as well as the distal end 22 and the opposite end 24 may be chamfered as desired to relieve stresses.

At the distal end 22, a collar 30 is provided from which radial adjustment of the boring tool can be effected. On each side of the collar((FIG. 3) a recess 33 is provided. These recesses 33 receive corresponding bolts 32, 34 which attach the collar 30 to the distal end of the tool body 12. At the center of the collar 30 is an adjusting screw 36. This adjusting screw 36 has a head with a suitable conventional opening to receive a cooperating tool to rotate the adjusting screw 36. Conveniently, the head of the adjusting screw 36 may have a hexagonal opening adapted to receive an allen wrench or comparable tool.

In addition, the collar 30 may be provided with an adjustment scale 38 which is graduated so as to provide a visual indication of the adjusted position of the adjusting screw 36. The scale 38 has a central mark as does the adjusting screw 36 have a central mark 40 so that relative position of the adjusting screw 36 and the collar 30 can be visually identified.

The boring tool 10 also has a cutting edge 42 which is operable to cut metal. In addition, the cutting edge 42 is positioned relative to the center of the boring tool 10 so that it projects beyond the external surface of the tool body 12. Unless this relationship is provided, the cutting edge 42 could not perform its intended function, i.e., the cutting edge must extend radially beyond the circumference of the tool body 12.

The collar 30 has a flattened, undercut portion 44 adjacent to the cutting edge 42. This undercut portion 44 is in general longitudinal alignment with an undercut portion 46 of the tool body 12 itself (see FIG. 2). The undercut portion 46 of the tool body 12 extends in a direction generally transverse to the longitudinal direction of the tool body 12. These two undercut portions 44, 46, cooperate to define an area where chips and swarf from the cutting operation can accumulate without interfering with operation of the boring tool 10.

The undercut portion 46 of the tool body 12 exposes an end 54 (see FIG. 4) of the tool holder 50. Another end 52 of the tool bar is exposed at the opposite side of the tool body 12 (see FIG. 1). At the end 54 (see FIG. 5), the tool bar 50 is provided with a tool cartridge 56 which carries a cutting element 58 having the cutting edge 42. The tool cartridge 56 is attached to the tool bar 50 by a suitable threaded fastener 58 (see FIG. 4). To securely hold the cartridge 56 against the tool bar 50 so that the cartridge 56 is restrained against rotation in the plane of the tool bar 50 and so that the cartridge 56 is constrained against tipping forwardly out of the plane of the tool bar 50, the cartridge 56 may have a base which is configured so as to key into the tool bar 50. For example, the cartridge 56 may include an ear 62 which extends laterally into a conforming recess of the tool bar 50, the ear extending from the top of the cartridge 56 to the bottom thereof so as to present a semicylindrical projection. Thus the ear 62 is keyed into the conforming recess of the tool bar 50 when the cartridge is held is place by the threaded fastener 58 and helps to hold the cartridge 56 against rotation in the plane of the tool bar 50 as well as against tipping forwardly about an axis lying in the plane of the tool bar 50.

On the side of the cartridge 56 opposite from the ear 62, the cartridge 56 includes a cutting element 60. This cutting element 60 is fabricated from a suitable conventional material adapted for cutting metal (e.g., industrial diamond) and may be purchased as an insert from any of a variety of commercial sources, e.g. the Carboloy company. Generally, the cutting element 60 has a side surface 64 which lies in a generally radial plane that intersects a second side surface 66 at the cutting edge 42 with a dihedral angle that is less than 90° With this relationship, the cutting element 60 can bore an accurate surface with a high degree of precision.

A channel 68 is provided on the top surface of the tool bar 50 at a location between the two ends 52, 54. This channel has a width measured in the direction of travel of the tool bar 50 which is greater than the maximum radial travel allowed for the tool bar 50. In the channel 68 there is an opening 70 which is located to one side of the longitudinal axis of the tool bar 50. Prefmay be made therein without departing from the spirit and scope of the invention.

Having thus described the invention, what is claimed as new, and desired to be secured by Letters Patent is:

1. A boring tool for use in connection with a machine tool comprising:
   a tool body having a longitudinal opening, a longitudinal axis, and a slot positioned generally perpendicular to the longitudinal axis and having a predetermined cross-sectional shape;
   a tool bar slidably situated in the slot, having a pair of ends, a cross-sectional shape which generally conforms to the predetermined cross-sectional shape, and an opening therethrough intermediate the ends, and carrying a cutting tool at one end thereof;
   a member shaped to conform to the opening through the tool bar, having a splined surface, being retained in the opening such that the splined surface is exposed;
   a longitudinally adjustable wedge, self-reacting against the member, disposed in the longitudinal opening of the tool body, and having a splined surface engaging the splined surface of the member; and
   means for longitudinally adjusting the wedge relative to the tool body such that the longitudinal position of the wedge relative to the tool body determines the position of the tool bar in the transverse opening through the engaged splined surfaces of the wedge and the member, thereby positioning the cutting tool.

2. The boring tool of claim 1 wherein:
   the longitudinal opening of the tool body has a generally circular cross section;
   the predetermined cross-sectional shape of the transverse opening is generally rectangular;
   the longitudinal opening and the transverse opening have spatial interference;
   the wedge is generally cylindrical with a flat side so as to have a D-shaped cross section, the flat side having the splines inclined at a predetermined angle to the longitudinal axis.

3. The boring tool of claim 1 wherein:
   the opening in the tool bar is generally circular and laterally offset from the center of the tool bar; and
   take-up means is provided in the tool body to bear against the tool bar adjacent to the opening so as to control the effect of manufacturing tolerances in accuracy of the boring tool.

4. The boring tool of claim 1 wherein the cutting tool is a cartridge mounted on the end of the tool bar and having a cutting element positioned thereon so as to protrude therefrom.

5. The boring tool of claim 1 wherein the tool body is generally cylindrical.

6. The boring tool of claim 1 wherein:
   the wedge includes an centrally disposed threaded opening, the pitch of the threads being fine; and
   the wedge adjusting means includes an adjusting screw extending longitudinally through the longitudinal opening of the tool body, having a thread pitch which conforms to that of the threaded opening in the wedge, having an exposed head at the distal end of the tool body so that the position of the wedge can be controlled by the adjusting screw.

7. A boring tool for use in connection with a machine tool comprising:
   a generally cylindrical tool body having a distal end, an outside radius, a generally cylindrical bore extending longitudinally from the distal end, and a slot extending transversely of the tool body with a generally rectangular cross section, the slot intersecting the cylindrical bore such that the slot and the bore share a common volume;
   a generally rectangular tool bar slidably situated in the slot, having a pair of ends, a cross-sectional shape with dimensions which closely conform to corresponding dimensions of the slot, an opening between the ends positioned at the common volume, and carrying a cutting tool at one end thereof, at least a portion of the cutting tool projecting beyond the outside radius of the tool body;
   a member fitted in the opening of the tool bar, having a splined surface, and being retained in the opening such that at least a part of the splined surface extends into the common volume;
   a generally cylindrical, longitudinally adjustable wedge positioned in the generally cylindrical bore of the tool body, having a flat lateral surface with splines at least a part of which extends into the common volume where it mates with at least a part of the splined surface of the member, the splines of the wedge being inclined at a small angle relative to the longitudinal axis of the wedge; and
   means for longitudinally adjusting the wedge relative to the tool body such that the longitudinal position of the wedge relative to the tool body determines the position of the tool bar in the slot through relative movement between the engaged spline portions of the wedge and the member, thereby positioning the cutting tool.

8. The boring tool of claim 7 wherein:
   the opening in the tool bar is laterally offset from the center of the tool bar; and
   take-up means is provided in the tool body to bear against a surface of the tool bar adjacent to the opening so as to control the effect o manufacturing tolerances in accuracy of the boring tool.

9. The boring tool of claim 7 wherein the cutting tool is a cartridge mounted on the end of the tool bar and having a cutting element positioned thereon so as to protrude beyond the outside radius of the tool body.

10. The boring tool of claim 1 wherein: the wedge includes an centrally disposed threaded opening, the pitch of the threads being fine; and
    the wedge adjusting means includes an adjusting screw extending longitudinally through the longitudinal opening of the tool body, having a thread pitch which conforms to that of the threaded opening in the wedge, having an exposed head at the distal end of the tool body so that the position of the wedge can be controlled by the adjusting screw.

11. A boring tool for use in connection with a machine tool comprising:
    a tool body having a longitudinal opening, a longitudinal axis, and a slot positioned generally perpendicular to the longitudinal axis and having a predetermined cross-sectional shape;
    a tool bar slidably situated in the slot, having a pair of ends, a cross-sectional shape which generally conforms to the predetermined cross-sectional shape, and a circular opening therethrough intermediate the ends, and carrying a cutting tool at one end thereof;

a generally circular member shaped to conform to the opening through the tool bar, having a splined surface, being retained in the opening such that the splined surface is exposed;

a longitudinally adjustable wedge, self-reacting against the generally circular member, disposed in the longitudinal opening of the tool body, and having a D-shaped cross-section and a splined surface engaging the splined surface of the member; and means for longitudinally adjusting the wedge relative to the tool body such that the longitudinal position of the wedge relative to the tool body determines the position of the tool bar in the transverse opening through the engaged splined surfaces of the wedge and the member, thereby positioning the cutting tool.

* * * * *